United States Patent
Kwon et al.

(10) Patent No.: US 9,342,428 B2
(45) Date of Patent: May 17, 2016

(54) MOBILE TERMINAL AND METHOD FOR MANAGING THE FILE SYSTEM THEREOF

(75) Inventors: Soon Wan Kwon, Anyang-si (KR); Joong Baik Kim, Seoul (KR); Seung Wook Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 138 days.

(21) Appl. No.: 14/240,909

(22) PCT Filed: Sep. 6, 2012

(86) PCT No.: PCT/KR2012/007187
§ 371 (c)(1),
(2), (4) Date: Feb. 25, 2014

(87) PCT Pub. No.: WO2013/036046
PCT Pub. Date: Mar. 14, 2013

(65) Prior Publication Data
US 2014/0223232 A1 Aug. 7, 2014

(30) Foreign Application Priority Data
Sep. 6, 2011 (KR) ........................ 10-2011-0090137

(51) Int. Cl.
*G06F 11/00* (2006.01)
*G06F 11/30* (2006.01)
*H04M 1/02* (2006.01)
*H04B 1/3883* (2015.01)
*G06F 9/44* (2006.01)

(52) U.S. Cl.
CPC ......... *G06F 11/3062* (2013.01); *H04M 1/0262* (2013.01); *G06F 9/4401* (2013.01); *H04B 1/3883* (2013.01)

(58) Field of Classification Search
CPC ............ G06F 11/3062; G06F 11/1456; G06F 11/1451
See application file for complete search history.

(56) References Cited

U.S. PATENT DOCUMENTS 5,220,520 A  6/1993 Kessoku
5,519,871 A * 5/1996 Shimoda ....................... 713/300

(Continued)

FOREIGN PATENT DOCUMENTS

DE  41 02 887 A1  8/1991
GB  2 270 445 A  3/1994

(Continued)

*Primary Examiner* — Philip Guyton
(74) *Attorney, Agent, or Firm* — Jefferson IP Law, LLP

(57) ABSTRACT

A mobile terminal and a method for managing a file system thereof are provided. The method of managing a file system of a mobile terminal having a battery cover and a battery cover coupling unit includes sensing an interruption of contact at a portion of a contact area between the battery cover and the battery cover coupling unit, generating a metadata list including metadata on data to be synchronized from among data cached in a volatile memory, after the sensing of the interruption of contact at the preset portion, sensing an interruption of contact at another portion of the contact area between the battery cover and the battery cover coupling unit after the previous sensing, and storing the metadata of the metadata list in a non-volatile memory, if the interval between the sensing operations is less than or equal to a threshold value.

15 Claims, 17 Drawing Sheets

(56) References Cited

U.S. PATENT DOCUMENTS

| | | | | |
|---|---|---|---|---|
| 5,824,431 | A * | 10/1998 | Tsurumaru et al. | 429/97 |
| 7,085,594 | B2 * | 8/2006 | Hosoi | 455/572 |
| 8,250,038 | B2 * | 8/2012 | Li | 707/654 |
| 8,717,185 | B2 * | 5/2014 | Franceschini et al. | 340/635 |
| 2007/0009788 | A1 * | 1/2007 | Indik | 429/100 |
| 2011/0093650 | A1 * | 4/2011 | Kwon et al. | 711/103 |

FOREIGN PATENT DOCUMENTS

| | | | |
|---|---|---|---|
| GB | 2270445 A | * | 3/1994 |
| JP | 2008-187410 A | | 8/2008 |
| KR | 10-2003-0095743 A | | 12/2003 |
| KR | 10-2004-0105137 A | | 12/2004 |
| KR | 10-2009-0022091 A | | 3/2009 |
| KR | 10-2011-0041675 A | | 4/2011 |

* cited by examiner (a)

(b)

MOBILE TERMINAL AND METHOD FOR MANAGING THE FILE SYSTEM THEREOF

TECHNICAL FIELD

The present invention relates to a mobile terminal and a method for managing a file system thereof More particularly, the present invention relates to a method and apparatus for managing a file system in case a battery is suddenly removed from the mobile terminal.

BACKGROUND ART

Recently technologies about a mobile terminal have been developed greatly. However, users' demands have been increased much faster than a technology development speed of a mobile terminal. Performance of a mobile terminal has been enhanced remarkably to meet users' demands. This requires a mobile terminal to consume much electric power. Therefore, a user often uses a secondary battery or an additional battery.

An electronic device employs a file system to effectively manage data. A file system based on a typical personal computer has been widely known. In these days, a journaling technique or other similar techniques have been utilized to secure the stability of a file system.

A journaling function is to apply a transaction function in a database field to a file system. In case any change occurs in a file system, metadata of a file is recorded as a log file in a nonvolatile memory. If a system is shut down abnormally, a file system can be recovered relatively faster by referring to a log file.

Most of recent mobile terminals have applied a file system. In case an existing file system is applied to a mobile terminal, some problems are caused. A mobile terminal uses a battery in general. A user may remove intentionally a battery so as to change a battery or change or for any other purpose. Additionally, a battery may be removed due to an external impact or any other reason regardless of a user's intention. This removal of a battery may invite a serious error in a file system. In a file system to which a journaling function is applied, an error can be corrected or recovered by examining a journaling region. However, such a journaling function has been developed to fast examine and recover a storage having a very great capacity of a sever-level computer. Therefore, if a journaling technique is applied to any errorless file system, an access time to the file system becomes longer than before. This delay in an access time is considered as overhead in a mobile terminal Thus, there is a need to appropriately reduce a journaling function to apply it to a mobile terminal Meanwhile, as discussed above, any error may occur in a file system when a battery is removed from a mobile terminal It is therefore desirable to prevent or delay the removal of a battery.

DISCLOSURE OF INVENTION

Technical Problem

The present invention is proposed to solve the above-discussed problem and has the object of securing the stability of a file system by effectively obviating a situation where a file error occurs in case of the removal of a battery.

Solution to Problem

In order to accomplish the above object, an embodiment of the present invention provides a method for managing a file system of a mobile terminal having a battery cover and a battery cover coupling unit. This method may comprise a first sensing step of sensing an interruption of contact at a preset portion of a contact area between the battery cover and the battery cover coupling unit, a step of creating a metadata list containing metadata on synchronization target data from among data cached in a volatile memory, after the sensing of the interruption of contact at the preset portion, a second sensing step of sensing an interruption of contact at another preset portion of the contact area between the battery cover and the battery cover coupling unit after the first sensing step, and a storage step of storing the metadata of the metadata list in a nonvolatile memory, if a removal time between the second sensing step and the first sensing step is equal to or less than a predetermined threshold value.

In order to accomplish the above object, another embodiment of the present invention provides a mobile terminal having a battery cover and a battery cover coupling unit. This mobile terminal may comprise a battery cover sensing unit configured to sense an interruption of contact at a preset portion of a contact area between the battery cover and the battery cover coupling unit, and to sense an interruption of contact at another preset portion of the contact area between the battery cover and the battery cover coupling unit, a synchronization unit configured to create, after the interruption of contact is sensed at the preset portion, a metadata list containing metadata on synchronization target data from among data cached in a volatile memory, and a removal prediction unit configured to determine whether a removal time between a time point of sensing the interruption of contact at the preset portion and a time point of sensing the interruption of contact at the another preset portion is equal to or less than a predetermined threshold value or not, wherein the synchronization unit is further configured to store the metadata of the metadata list in a nonvolatile memory if the removal time is equal to or less than the threshold value.

Advantageous Effects of Invention

According to an embodiment of the present invention, any error occurring in a file system in case of the removal of a battery can be effectively prevented and recovered.

MODE FOR THE INVENTION

Hereinafter, embodiments of the present invention will be described more fully with reference to the accompanying drawings.

In the following description, well known or widely used techniques may not be described or illustrated in detail to avoid obscuring the essence of the present invention.

Although the drawings represent exemplary embodiments of the invention, the drawings are not necessarily to scale and certain features may be exaggerated or omitted in order to better illustrate and explain the present invention.

Embodiments of this invention will be now described with reference to the drawings.

The present invention may be applied to a mobile terminal that has a battery cover.

A time interval between an initiation time point and a completion time point of a battery cover removal may be referred to as a removal time. In actual, a removal time is considered as a time interval between time points of sensing the initiation and completion of the removal of a battery cover by a sensor for sensing the contact of a battery cover. By detecting the interruption of contact, the sensor can sense the initiation and completion of the removal of a battery cover. Depending on a removal form of a battery cover, real time points of initiating and completing the removal of a battery cover may be different from time points of sensing them by the sensor. Therefore, a time interval between a time point of sensing the interruption of contact at a preset portion and a time point of sensing the interruption of contact at another preset portion by the sensor will be referred to as a removal time hereinafter.

Figure 1:
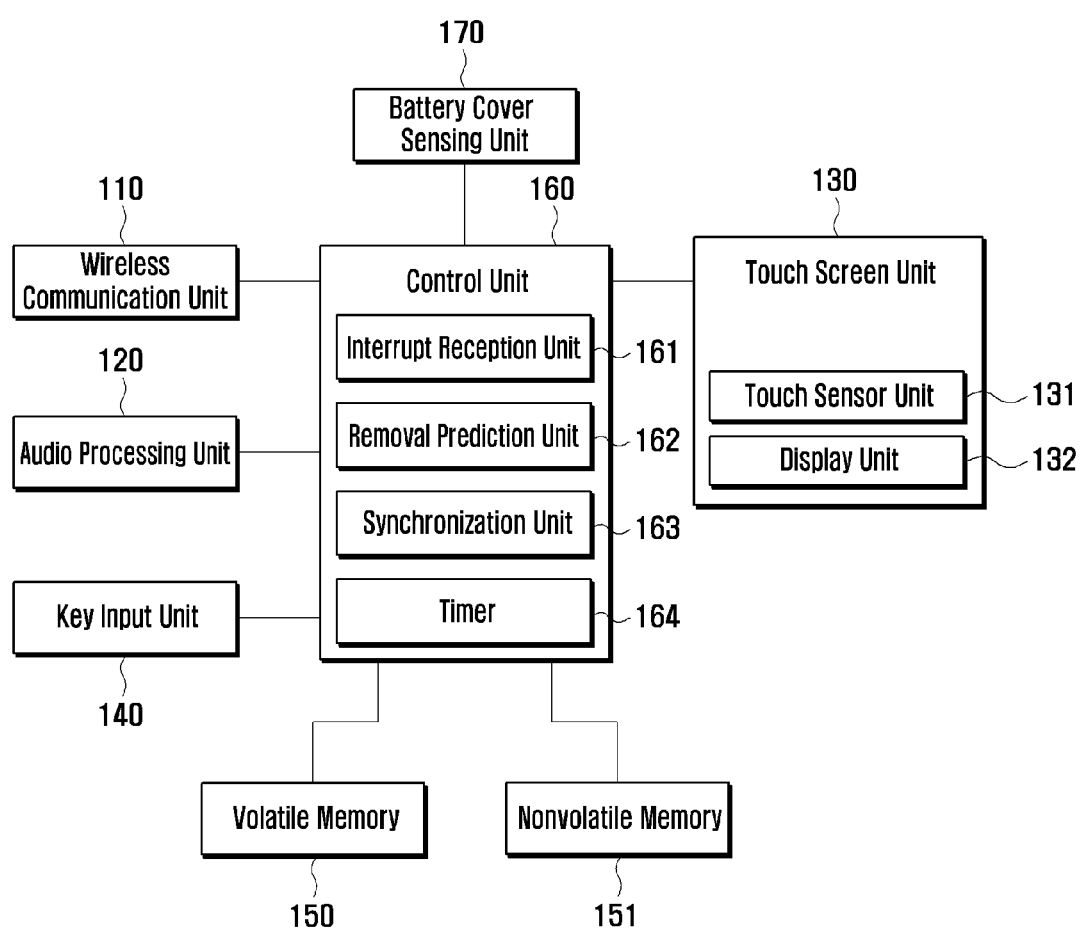
FIG. 1 is a block diagram illustrating an internal structure of a mobile terminal 100 in accordance with an embodiment of the present invention.

FIG. 1 is a block diagram illustrating an internal structure of a mobile terminal 100 in accordance with an embodiment of the present invention. The mobile terminal 100 according to an embodiment of the present invention may include a wireless communication unit 110, an audio processing unit 120, a touch screen unit 130, a key input unit 140, a volatile memory 150, a nonvolatile memory 151, a control unit 160, and a battery cover sensing unit 170. Although not shown in FIG. 1, the mobile terminal 100 may further include a battery cover coupling unit and a battery cover shown in FIGS. 2A to 2D. This will be described later with reference to FIGS. 2A to 2D.

The wireless communication unit 110 performs a function to transmit or receive data for a wireless communication of the mobile terminal 100. The wireless communication unit 110 may include an RF (Radio Frequency) transmitter that up-converts the frequency of an outgoing signal and amplifies the signal, an RF receiver that amplifies with low-noise an incoming signal and down-converts the frequency of the signal, and the like. Additionally, the wireless communication unit 110 may receive data through a wireless channel and transfer the received data to the control unit 160, and also transmit output data of the control unit 160 through a wireless channel.

The audio processing unit 120 may be formed of a CODEC, which may be composed of a data codec for processing packet data or the like and an audio codec for processing audio signals such as voice. The audio processing unit 120 converts digital audio signals into analog audio signals through the audio codec and then reproduces the analog audio signals through a speaker (SPK), and also receives analog audio signals from a microphone (MIC) and then converts the analog audio signals into digital audio signals through the audio codec.

The touch screen unit 130 includes a touch sensor unit 131 and a display unit 132. The touch sensor unit 131 detects a user's touch input. The touch sensor unit 131 may be formed of a touch detecting sensor of a capacitive overlay type, a resistive overlay type, an infrared beam type, etc. or a pressure sensor. Alternatively, any other type sensor device capable of detecting contact or pressure of an object may be used for the touch sensor unit 131. The touch sensor unit 131 detects a user's touch input, creates a sensing signal, and transfers the sensing signal to the control unit 160. This sensing signal contains coordinate data of a user's touch input. In case a user inputs a touch drag action, the touch sensor unit 131 creates a sensing signal containing coordinate data of a touch drag path and transfers it to the control unit 160.

Particularly, the touch sensor unit 131 may detect a user's input for spreading and displaying a group of object items. This user's input may include a touch (including a multi touch), a drag, or the like.

The display unit 132 may be formed of LCD (Liquid Crystal Display), OLED (Organic Light Emitted Diode), AMOLED (Active Matrix OLED), or the like. The display unit 131 visually offers a user a variety of information such as a menu of the mobile terminal 100, any input data, function setting information, and the like. The display unit 132 performs a function to output a booting screen, an idle screen, a menu screen, a call screen, and any other application screen of the mobile terminal 100.

Although the mobile terminal 100 of the present invention may include the above-discussed touch screen unit, an embodiment of the present invention to be described hereinafter is not always applied to only the mobile terminal 100 having the touch screen unit. In case this invention is applied to any mobile terminal having no touch screen, the touch screen unit 130 shown in FIG. 1 may be modified to perform a function of the display unit 132 only.

The key input unit 140 receives a user's key manipulation for controlling the mobile terminal 100, creates an input signal, and transfers it to the control unit 160. The key input unit 140 may be formed of a keypad having alphanumeric keys and navigation keys, and may also include some function keys disposed at sides of the mobile terminal 100. In case of a mobile terminal that allows all manipulations by means of the touch screen unit 130 only, the key input unit 140 may be removed.

The nonvolatile memory 151 stores permanently or semi-permanently programs and data required for the operation of the mobile terminal 100. The nonvolatile memory 151 may be divided into a program region and a data region. The program region may store a program for controlling a general operation of the mobile terminal 100, an operating system (OS) for booting the mobile terminal 100, an application required for playing multimedia contents, an application required for any optional function of the mobile terminal 100, e.g., a camera function, a sound output function, or an image or video reproduction function, and the like. The data region may store data created in connection with the use of the mobile terminal 100 such as image, video, phonebook, audio data, and the like. The nonvolatile memory 151 may include a flash memory, a magnetic storage device (e.g., a hard disk, a diskette drive, a magnetic tape), and the like.

The volatile memory 150 stores temporarily programs and data for the actual execution of such programs. To run a certain program by the control unit 160, such a program and associated data stored in the nonvolatile memory 151 should be loaded onto the volatile memory 150. Using the loaded program and data on the volatile memory 150, the control unit 160 performs a particular function. Additionally, any temporary data required for such a program function is stored in the volatile memory 150. For example, the volatile memory is RAM.

While a program runs, any data having a need for semi-permanent storage should be stored in the nonvolatile memory 151. Data stored in the volatile memory 150 only is removed when the supply of electric power is stopped. For example, phone numbers of a phonebook, photos captured using the mobile terminal 100, and the like should be stored in the nonvolatile memory 151. The reason is that such data stored in the volatile memory 150 only is removed due to no supply of electric power.

The nonvolatile memory 151 has an advantage of storing data permanently. However, access to the nonvolatile memory 151 requires a greater time than access to the volatile memory 150. Namely, it takes a long time to load data from the nonvolatile memory 151 or to add or revise data in the nonvolatile memory 151. Therefore, in order to obviate this drawback, the control unit 160 may temporarily store data of the nonvolatile memory 151 in the volatile memory 150. This is referred to as a cache. For example, let's suppose that a user adds a phone number to a phonebook. This data on the added phone number should be stored in the nonvolatile memory 151. However, since a repeated access to the nonvolatile memory 151 at every time for revising data requires a greater time, the control unit 160 may temporarily store data on the added phone number in the volatile memory 150. Thereafter, if a specific condition is satisfied, data on a phone number cached in the volatile memory 150 is reflected semi-permanently in the nonvolatile memory 151 by the control unit 160. For example, the control unit 160 may periodically store data, cached in the volatile memory 150, in the nonvolatile memory 151. Alternatively, if the mobile terminal 100 remains in an idle state for a given time, the control unit 160 may store data, cached in the volatile memory 150, in the nonvolatile memory 151.

The battery cover sensing unit 170 detects contact or non-contact between the battery cover and the battery cover coupling unit. The operation of the battery cover sensing unit 170 will be now described with reference to FIG. 2.

FIGS. 2A to 2D are schematic views illustrating a process of removing a battery cover and a battery in accordance with an embodiment of the present invention.

Figure 2A:
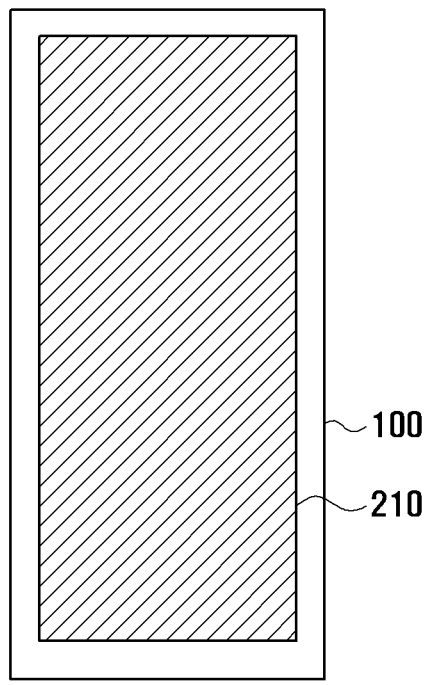
FIGS. 2A to 2D are schematic views illustrating a process of removing a battery cover and a battery in accordance with an embodiment of the present invention.
Figure 2B:
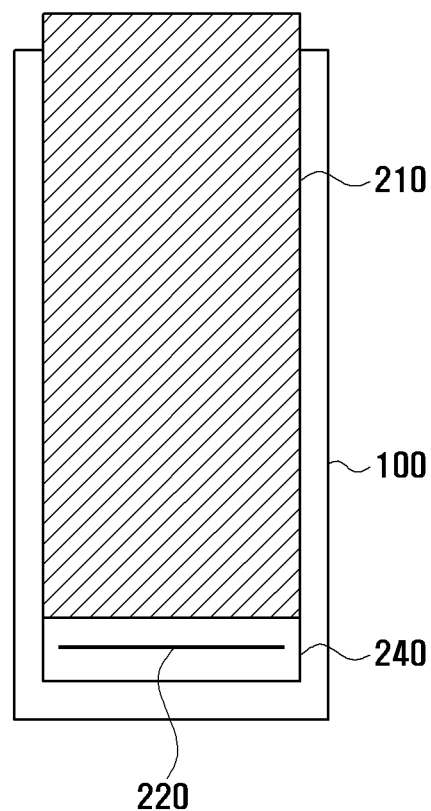

Referring to FIG. 2A, a battery cover 210 is attached to the rear side of the mobile terminal 100. Referring to FIG. 2B, the battery cover 210 moves slidingly in response to a user's manipulation. Therefore, contact at a contact area between the battery cover 210 and a battery cover coupling unit 240 is interrupted. In order to detect such a contact interruption, a first contact sensor 220 may be installed at a portion of the battery cover coupling unit 240. In a situation where the battery cover 210 is attached properly, the first contact sensor 220 and the battery cover 210 have to be in contact with each other. Thus, the first contact sensor 220 is disposed at a suitable position for reliable contact with the battery cover 210 attached properly. Further, the first contact sensor 220 may be preferably disposed at a portion where contact is initially interrupted when the battery cover 210 is removed from the mobile terminal 100. In an example shown in FIGS. 2A to 2D, the battery cover 210 slides upward and thereby is removed from the mobile terminal 100. Therefore, the first contact sensor 220 may be installed at a lower portion of the battery cover coupling unit 240. When a user starts to push the battery cover 210 upward, contact between the first contact sensor 220 and the battery cover 210 is interrupted. Thus, the first contact sensor 220 can effectively detect the initiation of the removal of the battery cover 210 from the mobile terminal 100. Namely, when the first contact sensor 220 fails to detect contact, the control unit 160 may determine that the removal of the battery cover 210 is initiated.

Figure 2C:
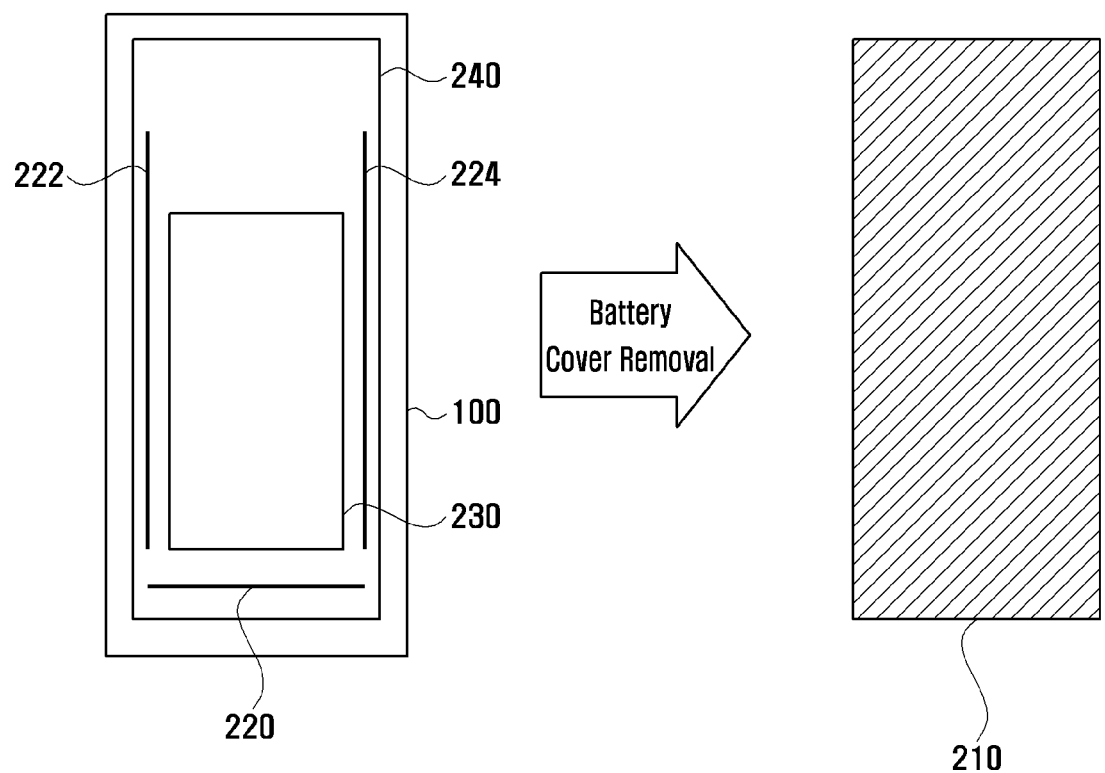
Figure 2D:
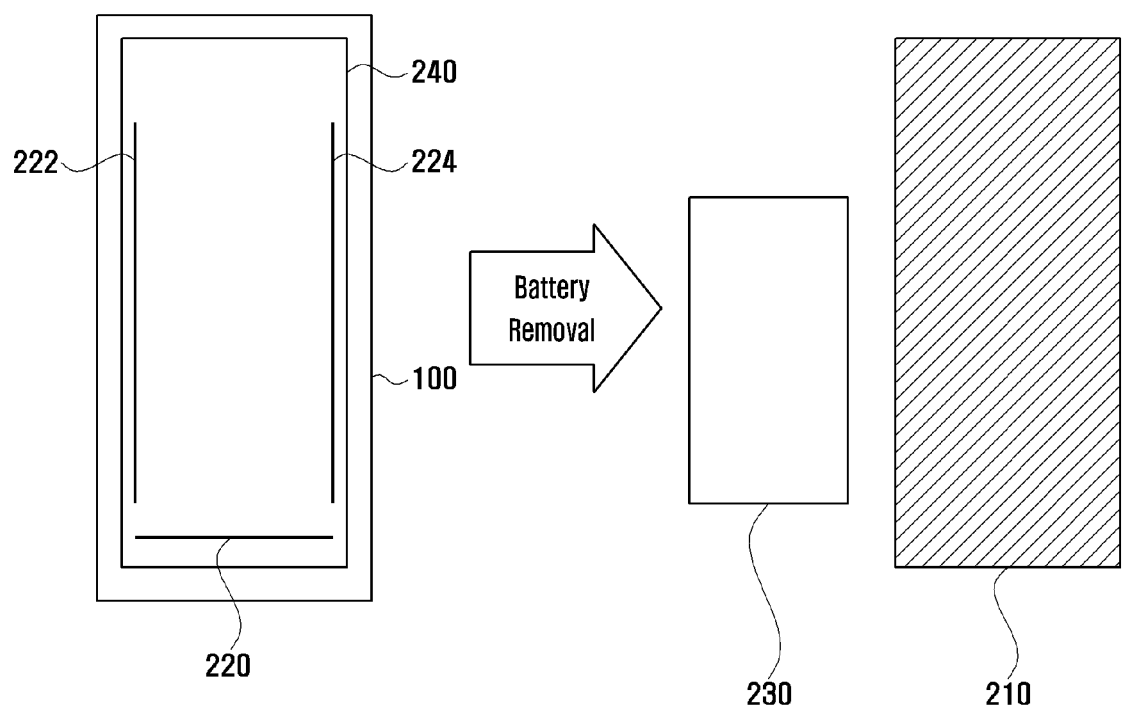

Referring to FIG. 2C, the battery cover 210 is completely removed from the mobile terminal 100. In a previous state shown in FIG. 2B, contact between the battery cover 210 and each of second contact sensors 222 and 224 is maintained. This contact is interrupted just before the upward-sliding battery cover 210 is completely removed from the mobile terminal 100. When the second contact sensors 222 and 224 fail to detect contact, the control unit 160 may determine that the removal of the battery cover 210 is completed. Alternatively, when the second contact sensors 222 and 224 fail to detect contact, the control unit 160 may determine that the battery cover 210 is in a state just before a complete removal thereof. Namely, the second contact sensors 222 and 224 can effectively detect that the battery cover 210 is completely removed from the mobile terminal 100 or arrives at a position just before a complete removal. As shown in FIG. 2C, the second contact sensors 222 and 224 are located at a suitable portion of a path along which the battery cover 210 moves slidingly. Therefore, contact can be detected just before the battery cover 210 is completely removed from the mobile terminal 100. Thereafter, referring to FIG. 2D, a battery 230 is removed from the mobile terminal 100.

The battery cover 210 and the contact sensors 220, 222 and 224 shown in FIGS. 2A to 2D are exemplary only. According to another embodiment, the battery cover may have another removal form, and the contact sensors may have another position. For example, the battery cover may be removed in a pull form instead of a slide form. The contact sensors may be disposed at another position on condition that contact between one of such contact sensors and the battery cover is interrupted at an initiation or near time point of a battery cover removal. Namely, the contact sensor may be disposed at a position where contact is interrupted when the battery cover starts to be removed. If the contact sensor detects the interruption of contact, the control unit 160 may determine that the removal of the battery cover is initiated. If there are several positions where contact is interrupted at an initiation time point of a battery cover removal, the contact sensors are disposed at such several positions. If any one of the sensors detects the interruption of contact, the control unit 160 may determine that the removal of the battery cover is initiated. The other contact sensor is disposed such that contact between that sensor and the battery cover is interrupted at a completion or near time point of a battery cover removal. For example, this contact sensor may be disposed so as to occupy most portions of the battery cover coupling unit 240. In this case, if all contact sensors or a preselected contact sensor detects the interruption of contact, the control unit 160 may determine that the removal of the battery cover 210 is completed or almost completed. Namely, when the battery cover sensing unit 170 detects the interruption of contact at a predetermined portion of a contact area between the battery cover 210 and the battery cover coupling unit 240, the control unit 160 determines that the removal of the battery cover 210 is initiated. Further, when the battery cover sensing unit 170 detects the interruption of contact at another predetermined portion of the contact area between the battery cover 210 and the battery cover coupling unit 240, the control unit 160 determines that the removal of the battery cover 210 is completed almost or fully.

Like an example shown in FIGS. 2A to 2D, the battery cover sensing unit 170 may be composed of several contact sensors 220, 222 and 224 that are physically separated from each other. In another example, the battery cover sensing unit 170 may be formed of a single contact sensor which is physically integrated. The contact sensors 220, 222 and 224 may be realized by means of a piezoelectric device. According to another embodiment, the contact sensors 220, 222 and 224 may be realized by means of an infrared sensor or an optical sensor. Alternatively, any other type sensor capable of sensing the contact or the interruption of contact of the battery cover 240 may be used for the contact sensors 220, 222 and 224.

Returning to FIG. 1, the control unit 160 controls the whole operation of respective elements in the mobile terminal. Particularly, in an embodiment of the present invention, the control unit 160 includes an interrupt reception unit 161, a removal prediction unit 162, a synchronization unit 163, and a timer 164.

The interrupt reception unit 161 receives an interrupt signal from the battery cover sensing unit 170 and transmits it to the removal prediction unit 162. Namely, when the interruption of contact of the battery cover 240 is detected, the battery cover sensing unit 170 creates an interrupt signal corresponding to the interruption of contact and then transmits it to the interrupt reception unit 161. Specifically, the battery cover sensing unit 170 transmits an interrupt signal to the interrupt reception unit 161 when the removal of the battery cover 240 is initiated as shown in FIG. 2B. This interrupt signal is referred to as a removal initiation interrupt signal. Also, the battery cover sensing unit 170 transmits an interrupt signal to the interrupt reception unit 161 when the removal of the battery cover 240 is completed as shown in FIG. 2C. This interrupt signal is referred to as a removal completion interrupt signal. Such interrupt signals transmitted respectively at time points shown in FIGS. 2B and 2C may be distinguished from each other. Such interrupt signals are urgency signals and thus may be transmitted in the form of FIQ (Fast Interrupt reQuest) or H-IRQ (High priority Interrupt ReQuest), for example.

When the removal initiation interrupt signal is received, the interrupt reception unit 161 transfers it to the removal prediction unit 162 and activates the timer 164. The activated timer 164 transmits a signal for indicating the expiration of timer to the removal prediction unit 162 after a specific time corresponding to a preset threshold value. This threshold value may be set in advance by a terminal manufacturer or a software provider. This threshold value will be described again in a discussion on the removal prediction unit 162.

When the removal initiation interrupt signal is received, the removal prediction unit 162 transmits it to the synchronization unit 163. Further, the removal prediction unit 162 determines whether a removal time between a time point of sensing the interruption of contact at a preselected portion and a time point of sensing the interruption of contact at another preselected portion is equal to or less than a preset threshold value. As mentioned above, a removal time may be a time interval between an initiation time point and a completion time point of the removal of the battery cover 240. However, in actual, a removal time is determined according to the detection at the battery cover sensing unit 170. Namely, a time interval between a time point of sensing the interruption of contact at a preselected portion, e.g., the first contact sensor 220, and a time point of sensing the interruption of contact at another preselected portion, e.g., the second contact sensors 222 and 224, is considered as a removal time. Thus, the removal prediction unit 162 determines that a removal time is a specific time required from the reception of the removal initiation interrupt signal to the reception of the removal completion interrupt signal. In case a removal time is greater than a threshold value, synchronization may be performed for the entire file system on the assumption that the battery cover 240 is removed slowly. In the contrary case, metadata only of the file system may be stored on the assumption that the battery cover 240 is removed quickly. A detailed operation that depends on the length of a removal time will be described later in a discussion on the synchronization unit 163.

The timer 164 transmits a timer elapse interrupt signal or a timer elapse signal to the removal prediction unit 162 when a time corresponding to a threshold value elapses. Therefore, if the removal completion interrupt signal is received before the timer elapse interrupt signal is received after the reception of the removal initiation interrupt signal, the removal prediction unit 162 may determine that a removal time is smaller than a threshold value. The reason is that a removal is completed before the expiration of timer. Additionally, if the timer elapse interrupt signal is received before the removal completion interrupt signal is received after the reception of the removal initiation interrupt signal, the removal prediction unit 162 may determine that a removal time is greater than a threshold value. This is a case in which a removal is not completed till the expiration of timer.

When the removal initiation interrupt signal is received from the removal prediction unit 162, the synchronization unit 163 creates a metadata list that contains metadata of synchronization target data among data cached in the volatile memory. Namely, the synchronization unit 163 creates a metadata list when the battery cover sensing unit 170 detects a removal initiation of the battery cover. Here, a metadata list refers to a list of metadata with regard to data cached in the volatile memory 150. Namely, a metadata list contains metadata of synchronization target data.

Additionally, if a removal time is equal to or less than a threshold value, the synchronization unit 163 stores metadata of a metadata list in the nonvolatile memory 151. The creation of a metadata list and the storage of metadata may be performed by the synchronization unit 163 under the control of the control unit 160 or the removal prediction unit 162. Such stored metadata may be applied to a file system of the nonvolatile memory 151 when the mobile terminal 100 is booted by receiving again electric power.

According to another embodiment, when the removal initiation interrupt signal is received from the removal prediction unit 162, the synchronization unit 163 creates a metadata list and then creates a synchronization data list that contains synchronization target data among cached data. According to still another embodiment, when the removal initiation interrupt signal is received from the removal prediction unit 162, the synchronization unit 163 creates a metadata list and a synchronization data list at the same time.

A synchronization data list contains data temporarily cached in the volatile memory 150 before data of the nonvolatile memory 151 is modified due to a user's manipulation or any other reason.

According to an embodiment in which a synchronization list is created, the synchronization unit 163 synchronizes data in the synchronization data list to the nonvolatile memory 151 when a removal time is greater than a threshold value. In case a removal time is greater than a threshold value, the removal prediction unit 162 may determine that the battery cover 240 is removed at a relatively slow speed. Therefore, in this case, the synchronization unit 163 synchronizes data of the synchronization data list to the nonvolatile memory 151 rather than stores metadata. Synchronization of data itself requires a relatively longer time but needs no separate recovery. Thus, in case there is any time to spare till the stop of power supply, it is desirable to synchronize data itself The creation of a synchronization data list and the synchronization of synchronization data may be performed by the synchronization unit 163 under the control of the control unit 160 or the removal prediction unit 162.

Respective elements of the mobile terminal 100 will be described later with reference to FIGS. 3 to 7.

Figure 3:
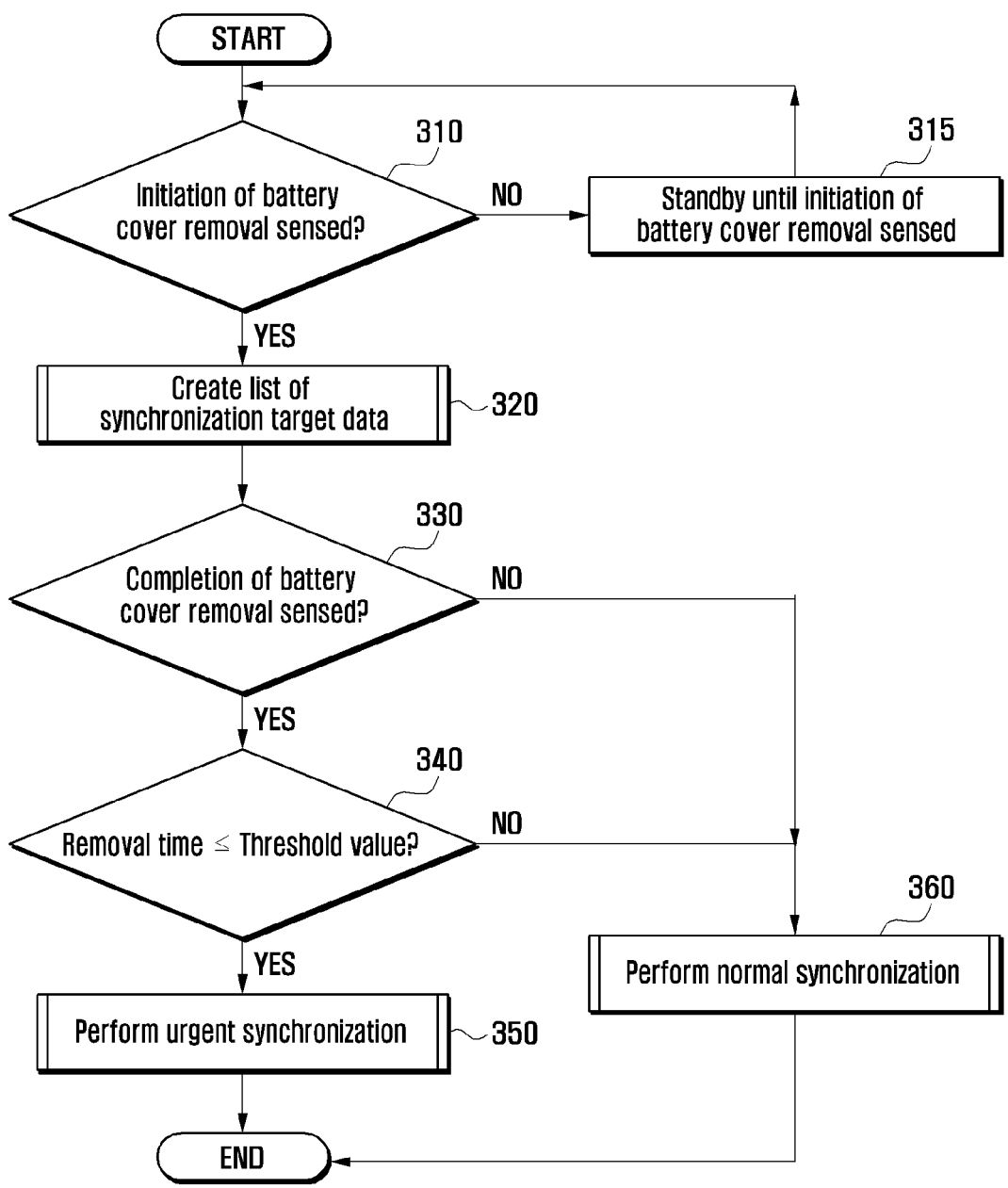
FIG. 3 is a flow diagram of a file system managing process in accordance with an embodiment of the present invention.

FIG. 3 is a flow diagram of a file system managing process in accordance with an embodiment of the present invention.

At step 310, the battery cover sensing unit 170 determines whether a removal initiation of the battery cover is detected. For example, when the first contact sensor 220 detects the interruption of contact as shown in FIG. 2B, the battery cover sensing unit 170 may determine that a removal initiation of the battery cover is detected. Namely, when the interruption of contact is detected from a preset portion (e.g., the first contact sensor 220) of a contact area between the battery cover 210 and the battery cover coupling unit 240, the battery cover sensing unit 170 may determine that a removal initiation of the battery cover is detected.

If a removal initiation of the battery cover is not detected, the file system managing process goes to step 315 and is on standby until a removal initiation of the battery cover is detected. In contrast, if a removal initiation of the battery cover is detected, the process goes to step 320.

At step 320, the synchronization unit 163 creates a list of synchronization target data.

Figure 4:
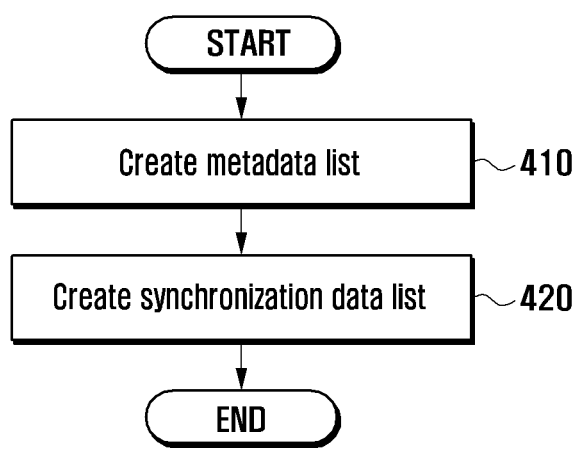
FIG. 4 is a detailed flow diagram of step 320 shown in FIG. 3.

FIG. 4 is a detailed flow diagram of step 320 shown in FIG. 3.

At step 410, the synchronization unit 163 creates a metadata list which refers to a list of metadata on data cached in the volatile memory 150. Namely, a metadata list contains metadata of synchronization target data.

At step 420, the synchronization unit 163 creates a synchronization data list of synchronization target data. A synchronization data list contains data temporarily cached in the volatile memory 150 before data of the nonvolatile memory 151 is modified due to a user's manipulation or any other reason.

The created metadata list and the created synchronization data list may be reflected in the nonvolatile memory 151 at steps 350 and 360.

In some embodiments, step 420 may be skipped. In this case, a normal synchronization based on synchronization data is performed in a typical manner. Namely, for example, according to a regular period, or in case the control unit remains in an idle state for a given time, data cached in the volatile memory 150 is synchronized to the nonvolatile memory 151.

Returning to FIG. 3, at step 330, the battery cover sensing unit 170 determines whether a removal completion of the battery cover is detected. For example, when the second contact sensors 222 and 224 detect the interruption of contact, the battery cover sensing unit 170 determines that the removal of the battery cover is completed. If a removal completion of the battery cover is not detected, the process goes to step 360 for a normal synchronization since enough time for synchronization seems to be secured.

If a removal completion of the battery cover is detected at step 330, the process goes to step 340. At step 340, the removal prediction unit determines whether a removal time is equal to or less than a threshold value or not. As mentioned above, a time interval between a time point of sensing the interruption of contact at a preselected portion and a time point of sensing the interruption of contact at another preselected portion is considered as a removal time. In an embodiment shown in FIGS. 2A to 2D, a time interval between a time point of sensing a state of FIG. 2B and a time point of sensing a state of FIG. 2C is a removal time. In case a removal time is equal to or less than a threshold value, the process goes to step 350. In case a removal time is more than a threshold value, the process goes to step 360.

In case a removal time is equal to or less than a threshold value, the synchronization unit 163 performs an urgent synchronization at step 350. In case a removal time is more than a threshold value, the process goes to step 360 and a normal synchronization is performed.

Figure 5:
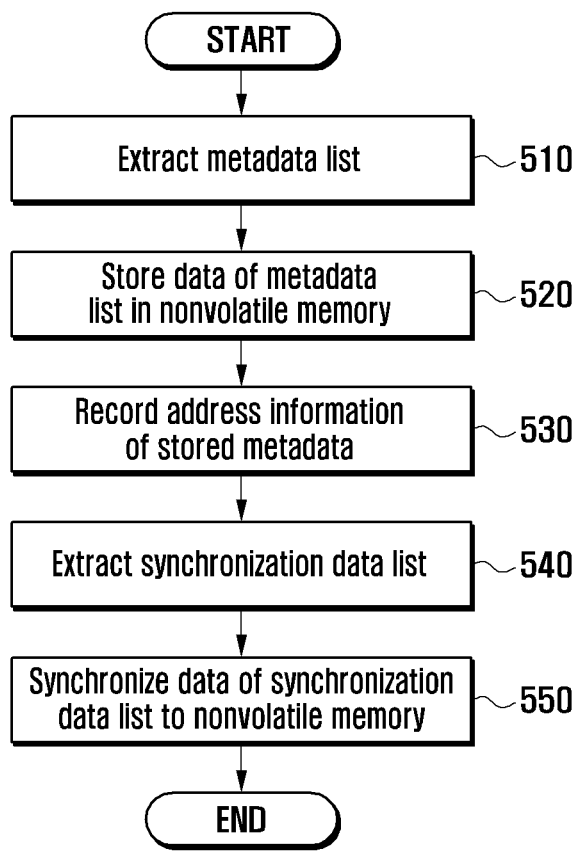
FIG. 5 is a detailed flow diagram of step 350 shown in FIG. 3.

FIG. 5 is a detailed flow diagram of step 350 shown in FIG. 3.

At step 510, the synchronization unit 163 extracts a metadata list. As discussed above, a metadata list is created at step 410. At step 520, the synchronization unit 163 stores metadata of the extracted metadata list in the nonvolatile memory 151. At step 530, the synchronization unit 163 stores address information about a stored location of metadata in a preset address storage location.

At step 540, the synchronization unit 163 extracts a synchronization data list. As discussed above, a synchronization data list is created at step 420 in FIG. 4. At step 550, the synchronization unit 163 synchronizes data of the extracted synchronization data list to the nonvolatile memory 151. Namely, data cached in the volatile memory 150 is applied to the nonvolatile memory 151.

The process from step 510 to step 530 may be performed at a fast speed. Therefore, this is performed in an urgent synchronization process of step 350. If electric power is still supplied even after step 530, steps 540 and 550 may be performed. In some embodiments, steps 540 and 550 may not be performed. Namely, in case there is a need for an urgent synchronization, the mobile terminal 100 may be on standby after performing the process from step 510 to step 530 until the supply of electric power is stopped.

Metadata stored at steps 510 to 530 may be used for a file system error recovery in a booting procedure.

Figure 6:
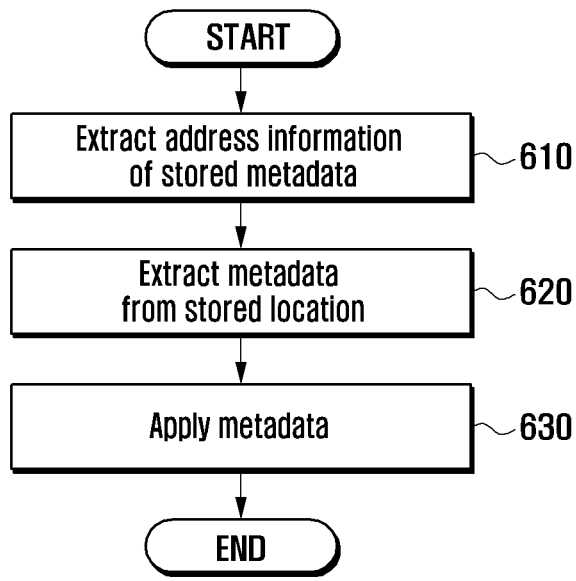
FIG. 6 is a flow diagram illustrating a booting process of a mobile terminal 100 in accordance with an embodiment of the present invention.

FIG. 6 is a flow diagram illustrating a booting process of a mobile terminal 100 in accordance with an embodiment of the present invention.

After a booting procedure is started, the synchronization unit 163 extracts address information about a stored location of metadata at step 610. In case metadata is stored at steps 510 to 530, address information about a stored location is recorded at a preset address storage location. Therefore, the synchronization unit 163 can extract address information about a stored location of metadata from the preset address storage location. However, if a predefined value, e.g., 'NULL' value, is detected from the address storage location, it may be determined that the mobile terminal 100 has been normally terminated. Namely, when the mobile terminal 100 is normally terminated, 'NULL' value may be recorded at the address storage location so as to indicate a normal termination. In this case, steps 620 and 630 are skipped. In the other cases, any error of a file system may be recovered at steps 620 and 630. According to another embodiment, a bit or any other type data for indicating a normal termination or not may be stored in the nonvolatile memory 151. By referring to this data, the synchronization unit 163 can determine whether to perform steps 620 and 630.

At step 620, the synchronization unit 163 extracts metadata from the stored location of metadata. Metadata may not contain all data cached in the nonvolatile memory 150. However, metadata may contain enough information for recovering any error of a file system. Metadata may contain the same information as metadata being used in the journaling technical field. Since details of metadata are widely known in the journaling technical field, a further description will be omitted herein.

At step 630, the synchronization unit 163 recovers an error of a file system by applying metadata. A file system recovery using metadata is well known in the journaling technical field, so that a detailed description thereof will be skipped herein.

Through a process from step 610 to step 630, an abnormally terminated file system of the mobile terminal 100 can be recovered.

Figure 7:
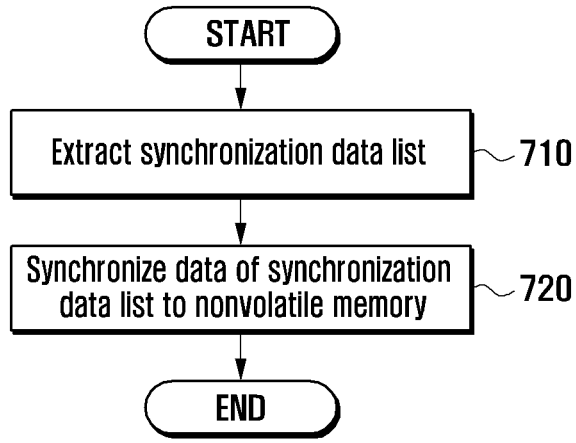
FIG. 7 is a detailed flow diagram of step 360 shown in FIG. 3.

FIG. 7 is a detailed flow diagram of step 360 shown in FIG. 3.

Step 360 is a case of a normal synchronization.

At step 710, the synchronization unit 163 extracts a synchronization data list.

At step 710, the synchronization unit 163 extracts a synchronization data list. As discussed above, a synchronization data list is created at step 420 in FIG. 4. At step 720, the synchronization unit 163 synchronizes data of the extracted synchronization data list to the nonvolatile memory 151. Namely, data cached in the volatile memory 150 is applied to the nonvolatile memory 151.

According to the comparison of an urgent synchronization process shown in FIG. 5 and a normal synchronization process shown in FIG. 7, metadata is stored first in the nonvolatile memory 151 in case of an urgent synchronization process. The storage of metadata may be performed at a faster speed in comparison with the storage of all cached data. Therefore, in case there is a possibility that the battery will be removed shortly due to a fast removal of the battery cover 210, the synchronization unit 163 performs first the storage of metadata. In contrast, if the supply of electric power is maintained for a relatively longer time due to a slow removal of the battery cover 210, synchronization of data may be performed in a normal manner as shown in FIG. 7.

Figure 8:
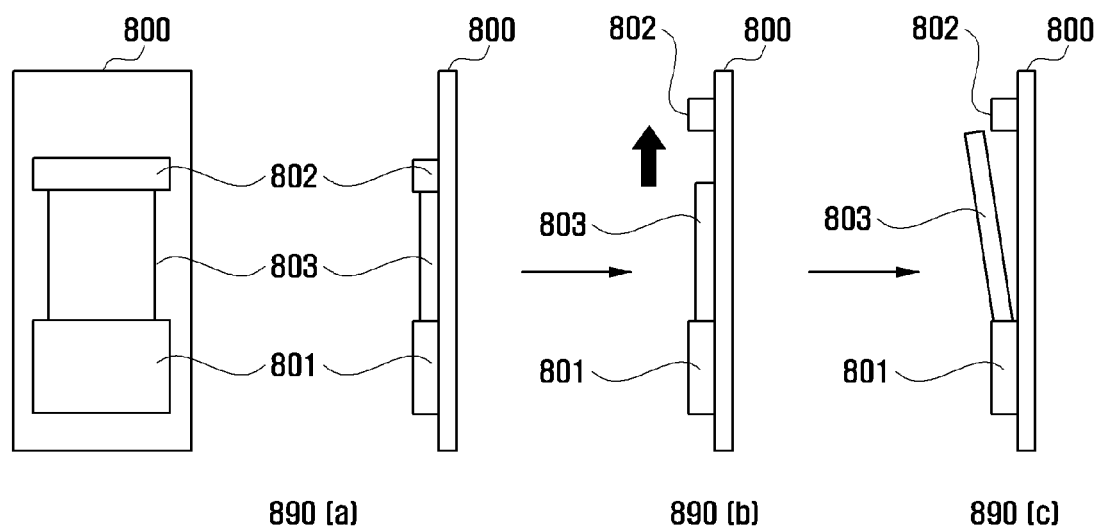
FIG. 8 is a schematic view illustrating a battery removal delay apparatus in accordance with the first embodiment of the present invention.

FIG. 8 is a schematic view illustrating a battery removal delay apparatus in accordance with the first embodiment of the present invention.

Referring to FIG. 8, a battery 803 is attached to a mobile terminal 800 at step 890(a). The battery 803 is fixed by means of a fixed member 801 and a sliding member 802.

At step 890(b), a user may force the sliding member 802 to slide in an arrow direction so as to remove the battery 803. Thereafter, at step 890(c), a user may remove the battery 803 by pulling it in a backward direction from the terminal FIG. 9 is a schematic view illustrating a battery removal delay apparatus in accordance with the second embodiment of the present invention.

Figure 9:
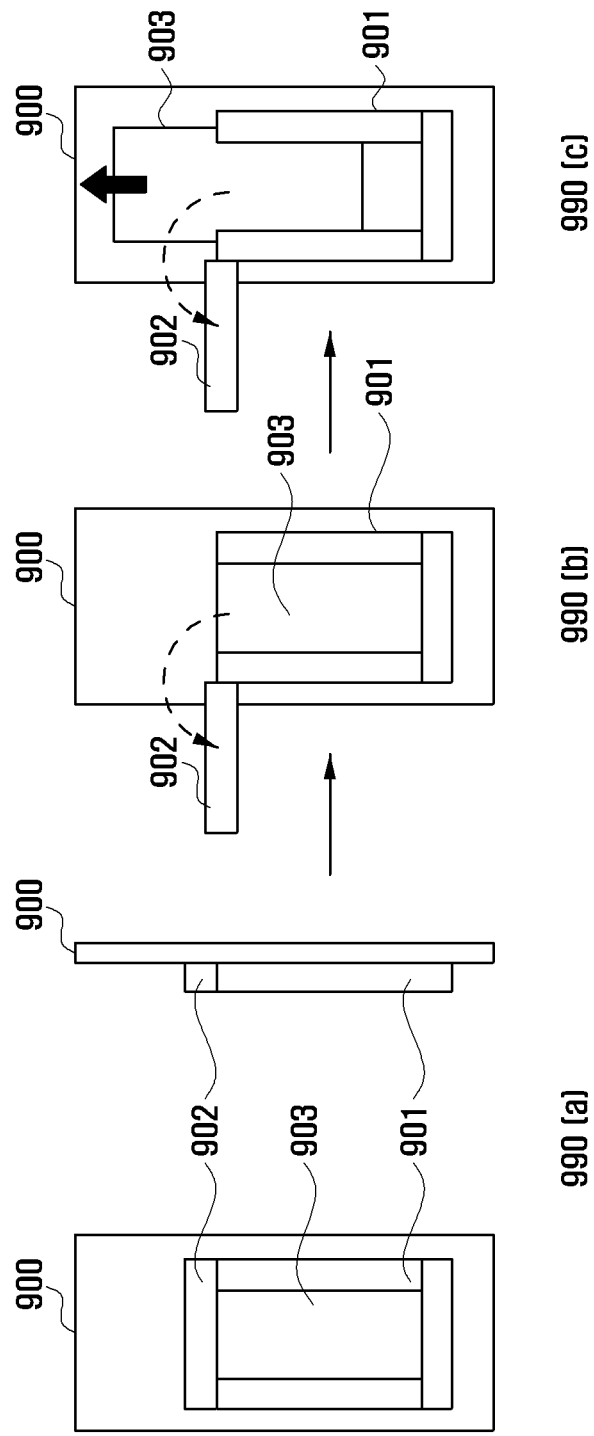
FIG. 9 is a schematic view illustrating a battery removal delay apparatus in accordance with the second embodiment of the present invention.

Referring to FIG. 9, a battery 903 is attached to a mobile terminal 900 at step 990(a). The battery 903 is fixed by means of a fixed member 901 and a flip-type member 902.

At step 990(b), a user may force the flip-type member 902 to rotate in a dotted arrow direction so as to remove the battery 903. Thereafter, at step 990(c), a user may remove the battery 903 by pulling it in an upward direction from the terminal.

Figure 10A:
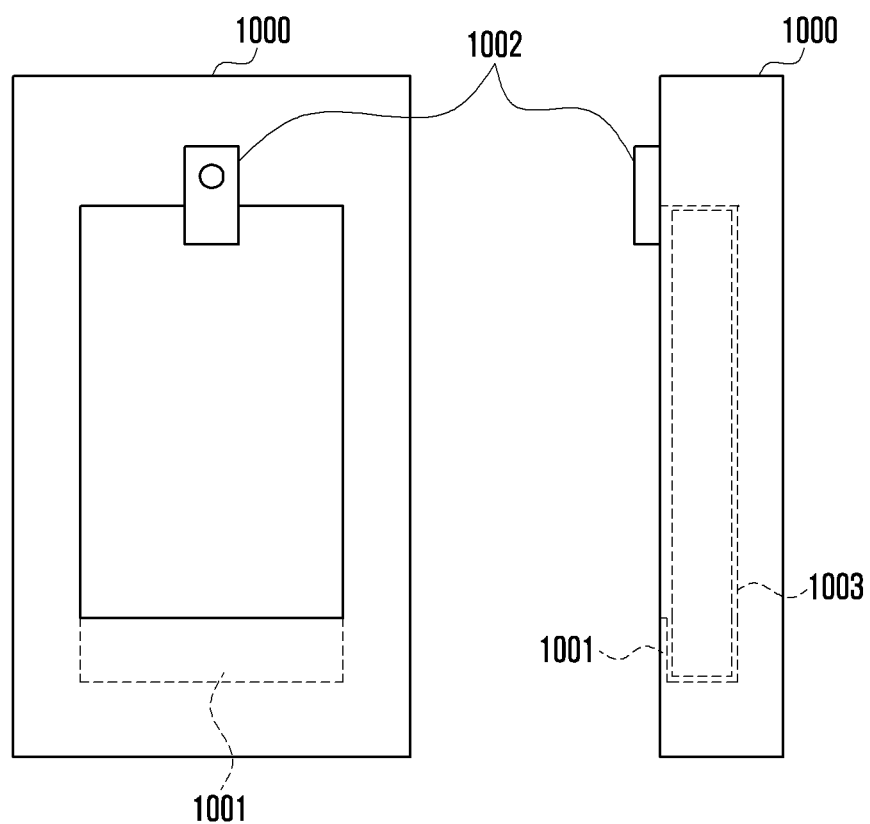
FIGS. 10A to 10C are schematic views illustrating a battery removal delay apparatus in accordance with the third embodiment of the present invention.
Figure 10B:
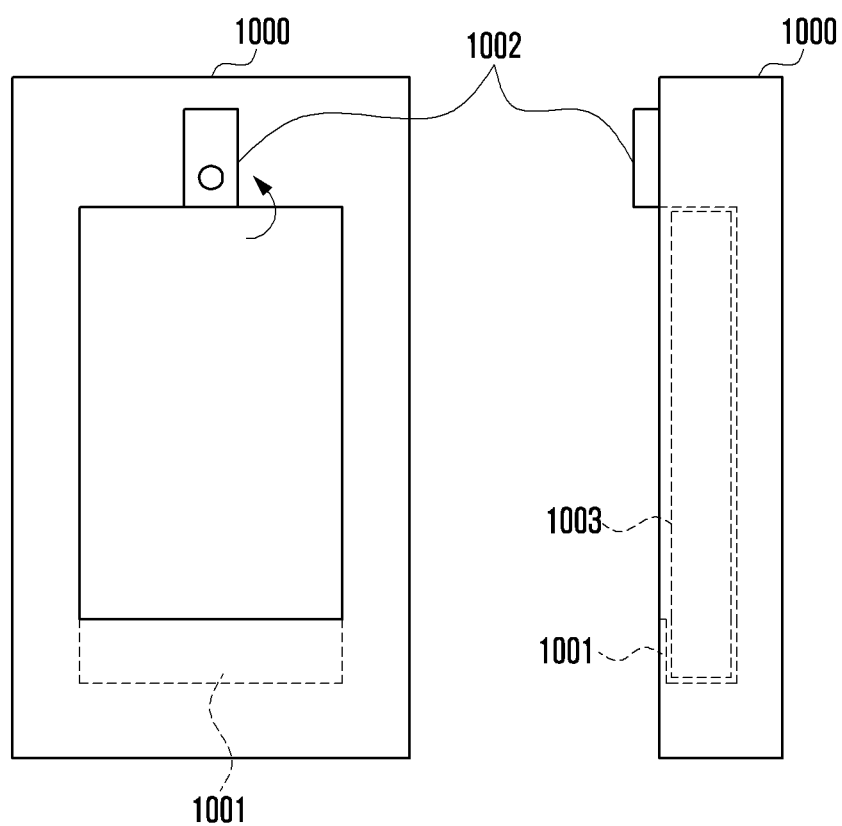
Figure 10C:
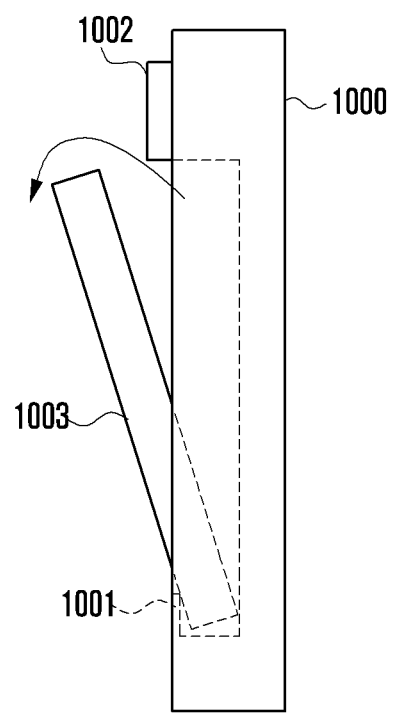

FIGS. 10A to 10C are schematic views illustrating a battery removal delay apparatus in accordance with the third embodiment of the present invention.

Referring to FIG. 10A, a battery 1003 is attached to a mobile terminal 1000. The battery 1003 is fixed by means of a fixed member 1001 and a rotation-type member 1002. In FIG. 10B, a user may force the rotation-type member 1002 to rotate in an arrow direction so as to remove the battery 1003. Thereafter, in FIG. 10C, a user may remove the battery 1003 by pulling the battery 1003 in a backward direction from the mobile terminal 1000.

Figure 11:
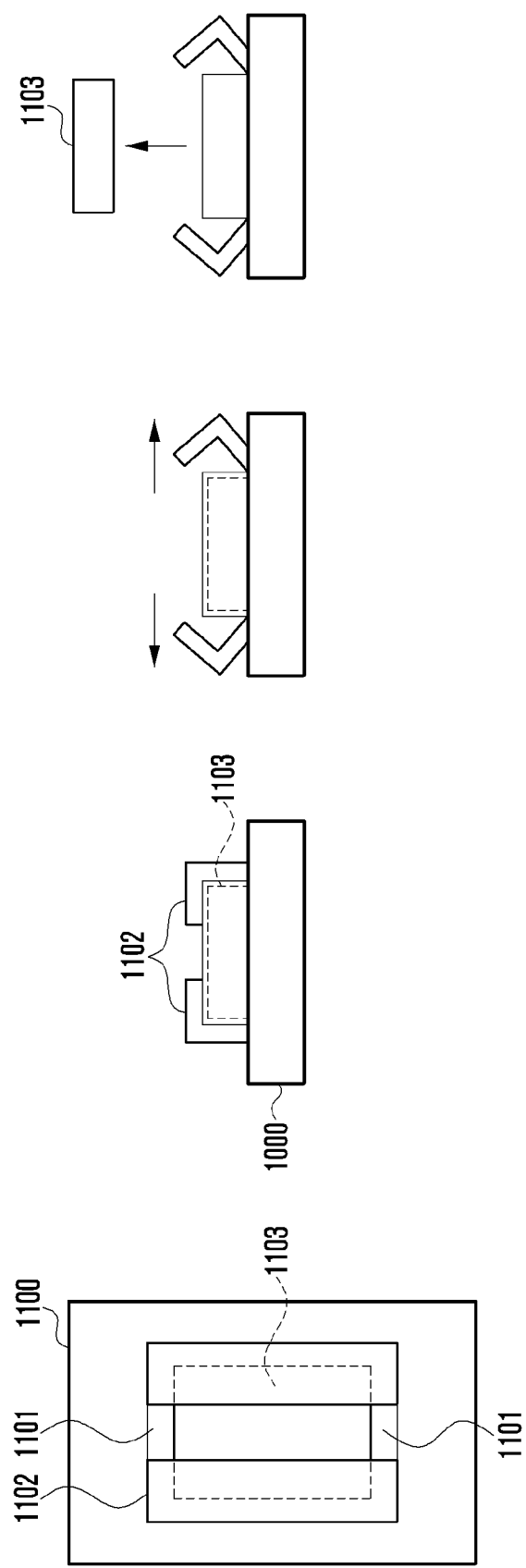
FIG. 11 is a schematic view illustrating a battery removal delay apparatus in accordance with the fourth embodiment of the present invention.

FIG. 11 is a schematic view illustrating a battery removal delay apparatus in accordance with the fourth embodiment of the present invention.

Referring to FIG. 11, a battery 1103 is attached to a mobile terminal 1100. The battery 1103 is fixed by means of a fixed member 1101 and a hinged movable member 1102. A user may spread sideward the movable member 1102 so as to remove the battery 1103, and then remove the battery 1103 by pulling the battery 1103 in a backward direction from the mobile terminal 1100.

In cases shown in FIGS. 8 to 11, the battery 803, 903, 1003 or 1103 can be removed after the sliding member 802, the flip-type member 902, the rotation-type member 1002, or the movable member 1102 is moved first. Therefore, in both of case where the battery is removed due to any external impact and case where a user removes intentionally the battery, the battery removal delay apparatus can delay a time to actually remove the battery.

Figure 12:
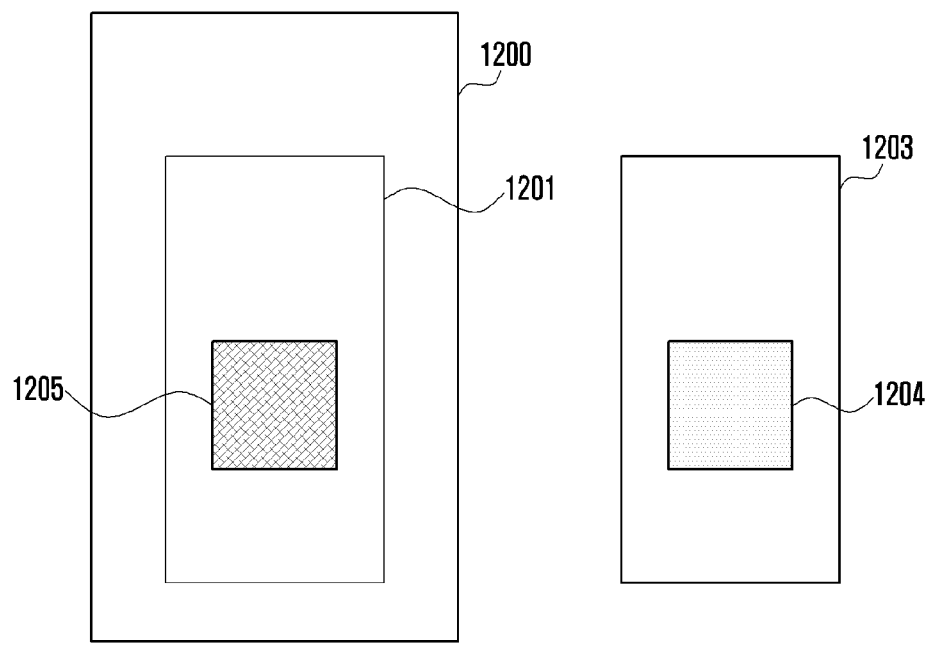
FIG. 12 is a schematic view illustrating a battery removal delay apparatus in accordance with the fifth embodiment of the present invention.
Figure 12:
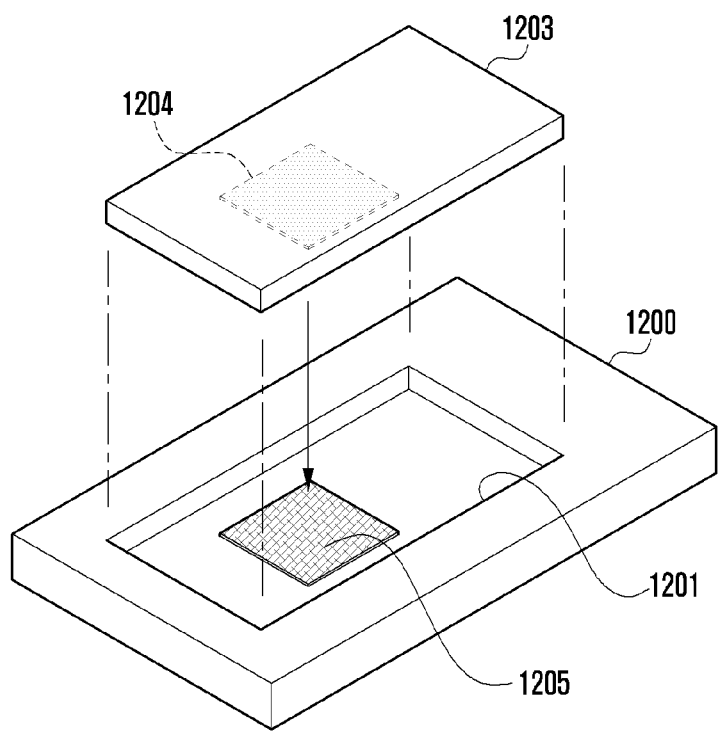

FIG. 12 is a schematic view illustrating a battery removal delay apparatus in accordance with the fifth embodiment of the present invention.

Referring to FIG. 12, a terminal 1200 has a battery insertion area 1201. Additionally, the battery insertion area 1201 has a first adhesive member 1205 formed therein. The first adhesive member 1205 may be a Velcro tape or any similar adhesive member. The battery 1203 has a second adhesive member 1204 on a surface thereof attached to the terminal 1200. The first and second adhesive members 1205 and 1204 adhere to each other until a force having a given strength or more is applied thereto. Therefore, this may also delay a time to remove the battery due to a user's mistake or any other accident. The positions of the adhesive members 1204 and 1205 may be varied according to embodiments, but both adhesive members 1204 and 1205 should be placed at corresponding positions. Contrary to FIG. 12, the adhesive members 1204 and 1205 may be located at some of four edges of the battery 1203 and the battery insertion area 1201. Additionally, the battery 1203 and the battery insertion area 1201 may have suitably distributed several adhesive members rather than a single adhesive member.

As discussed above, the mobile terminal of this invention may further include the removal delay apparatus for delaying the removal of the battery as shown in FIGS. 8 to 12 or in any other similar manner.

All of the sliding member, the flip-type member, the rotation-type member, and any other member that fixes the battery and moves to allow the battery to be removed are referred to as a movable-type member.

In some embodiments, the fixed member 801, 901, 1001 or 1101 may be omitted. In this case, the movable-type member fixes the battery at a certain position. If the movable-type member is moved to another position, the battery is in a removable state.

In another embodiment, the mobile terminal may further include a mercury cell or any other secondary battery that can supply electric power for a while even after the battery is removed. Such a secondary battery should have ability to maintain electric power until the mobile terminal completes the synchronization of a file system or the storage of metadata.

It will be understood that each block of the flowchart illustrations and combinations of blocks in the flowchart illustrations can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create a way to implement the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instructions that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may also represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Also, the term 'unit' used in embodiments of the present invention signifies, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented so as to execute one or more CPUs in a device.

The mobile terminal according to an embodiment of the present invention refers to a portable electronic device such as a mobile phone, a PDA (Personal Digital Assistant), a navigation terminal, a digital broadcasting receiver, a PMP (Portable Multimedia Player), and the like.

Although a few embodiments of the present invention have been described for illustrative purposes, those skilled in the art will appreciate that various modifications, additions and substitutions are possible without departing from the scope and spirit of the invention as disclosed in the accompanying claims. Therefore, the scope of the present invention should be defined by the appended claims and their equivalents.

While the present invention has been particularly shown and described with reference to an exemplary embodiment thereof, it will be understood by those skilled in the art that various changes in form and details may be made therein without departing from the spirit and scope of this invention as defined by the appended claims.

The invention claimed is:

1. A method for managing a file system of a mobile terminal having a battery cover and a battery cover coupling unit, the method comprising:
   detecting a first interruption of contact at a first portion of a contact area between the battery cover and the battery cover coupling unit;
   generating metadata on synchronization target data from among data cached in a volatile memory, after the detecting of the first interruption of contact at the first portion;
   detecting a second interruption of contact at a second portion of the contact area between the battery cover and the battery cover coupling unit; and
   storing the metadata in a nonvolatile memory, if a time interval between a time for detecting the second interruption and a time for detecting the first interruption is equal to or less than a predetermined threshold value.

2. The method of claim 1, further comprising:
   generating a synchronization data list containing the synchronization target data from among the data cached in the volatile memory, after the detecting of the first interruption of contact at the first portion; and
   synchronizing data of the synchronization data list to the nonvolatile memory if the time interval is more than the threshold value.

3. The method of claim 1, wherein the storage step includes:
   extracting a metadata list;
   storing metadata of the extracted metadata list in the nonvolatile memory; and
   storing address information about a stored location of the metadata in a preset address storage location of the nonvolatile memory.

4. The method of claim 3, further comprising:
   extracting the address information stored in the address storage location, when a booting input is received; and
   applying the metadata stored in the nonvolatile memory to the file system by using the extracted address information.

5. The method of claim 3, further comprising:
   generating a synchronization data list containing the synchronization target data from among the data cached in the volatile memory; and
   synchronizing data of the synchronization data list to the nonvolatile memory.

6. The method of claim 1, wherein the mobile terminal further has a removal delay unit for delaying a time to remove a battery from the mobile terminal.

7. A mobile terminal having a battery cover and a battery cover coupling unit, the mobile terminal comprising:
   a battery cover sensing unit configured to detect a first interruption of contact at a first portion of a contact area between the battery cover and the battery cover coupling unit, and to detect a second interruption of contact at a second portion of the contact area between the battery cover and the battery cover coupling unit;
   a synchronization unit configured to generate, after the first interruption of contact is detected at the first portion, metadata on synchronization target data from among data cached in a volatile memory; and a removal prediction unit configured to determine whether a time interval between a time for detecting the first interruption of contact at the first portion and a time for detecting the second interruption of contact at the second portion is equal to or less than a predetermined threshold value or not, wherein the synchronization unit is further configured to store the metadata in a nonvolatile memory if the time interval is equal to or less than the threshold value.

8. The mobile terminal of claim 7, wherein the synchronization unit is further configured to generate a synchronization data list containing the synchronization target data from among the data cached in the volatile memory, after the first interruption of contact is detected at the first portion, and to synchronize data of the synchronization data list to the nonvolatile memory if the time interval is more than the threshold value.

9. The mobile terminal of claim 7, wherein the synchronization unit is further configured to extract a metadata list if the time interval is equal to or less than the threshold value, to store metadata of the extracted metadata list in the nonvolatile memory, and to store address information about a stored location of the metadata in a preset address storage location of the nonvolatile memory.

10. The mobile terminal of claim 9, wherein the synchronization unit is further configured to extract, when a booting input is received, the address information stored in the address storage location, and to apply the metadata stored in the nonvolatile memory to the file system by using the extracted address information.

11. The mobile terminal of claim 9, wherein the synchronization unit is further configured to generate, after the metadata is stored in the nonvolatile memory, a synchronization data list containing the synchronization target data from among the data cached in the volatile memory, and to synchronize data of the synchronization data list to the nonvolatile memory.

12. The mobile terminal of claim 7, further comprising:

a removal delay unit configured to delay a time to remove a battery from the mobile terminal.

13. The mobile terminal of claim 12, wherein the removal delay unit includes a movable member configured to be moved with regard to the mobile terminal and configured to fix at least a part of the battery or allowing the battery to be removed.

14. The mobile terminal of claim 13, wherein the removal delay unit further includes a fixed member being fixed to the mobile terminal and for fixing a part of the battery.

15. The mobile terminal of claim 12, wherein the removal delay unit includes a second adhesive member configured to adhere to a first adhesive member of the battery at a corresponding position.

* * * * *